United States Patent
Huang

[11] Patent Number: 6,113,234
[45] Date of Patent: Sep. 5, 2000

[54] EYEGLASS STRUCTURE

[76] Inventor: Yung-Ming Huang, 18F-2, No. 2 Lane 175, Sec. 3, Shiou-Lang Road, Chung-Ho City, Taipei Hsien 235, Taiwan

[21] Appl. No.: 09/340,398

[22] Filed: Jun. 28, 1999

[51] Int. Cl.[7] .................................................. G02C 9/00
[52] U.S. Cl. ................................................. 351/47; 351/57
[58] Field of Search ................................ 351/47, 48, 57, 351/58

[56] References Cited

U.S. PATENT DOCUMENTS 1,557,322  10/1925  Peck ........................................... 351/47
5,376,977  12/1994  Liu ............................................. 351/47

*Primary Examiner*—Huy Mai
*Attorney, Agent, or Firm*—Dougherty & Troxell

[57] ABSTRACT

This is a type of eyeglass structure that is an assembly of a main frame and a secondary frame. This utilizes the relationship of the aligned recessed notches of the main frame and the hook sections of the secondary frame. This piece has a main frame and secondary frame, which has the function of assembling and disassembling. This same pair of eyeglasses may house different prescription lenses, sunglass lenses or lenses with other functions. Finally, the secondary frame is formed of a single cast and requires no added processing and is a great advancement!

4 Claims, 3 Drawing Sheets

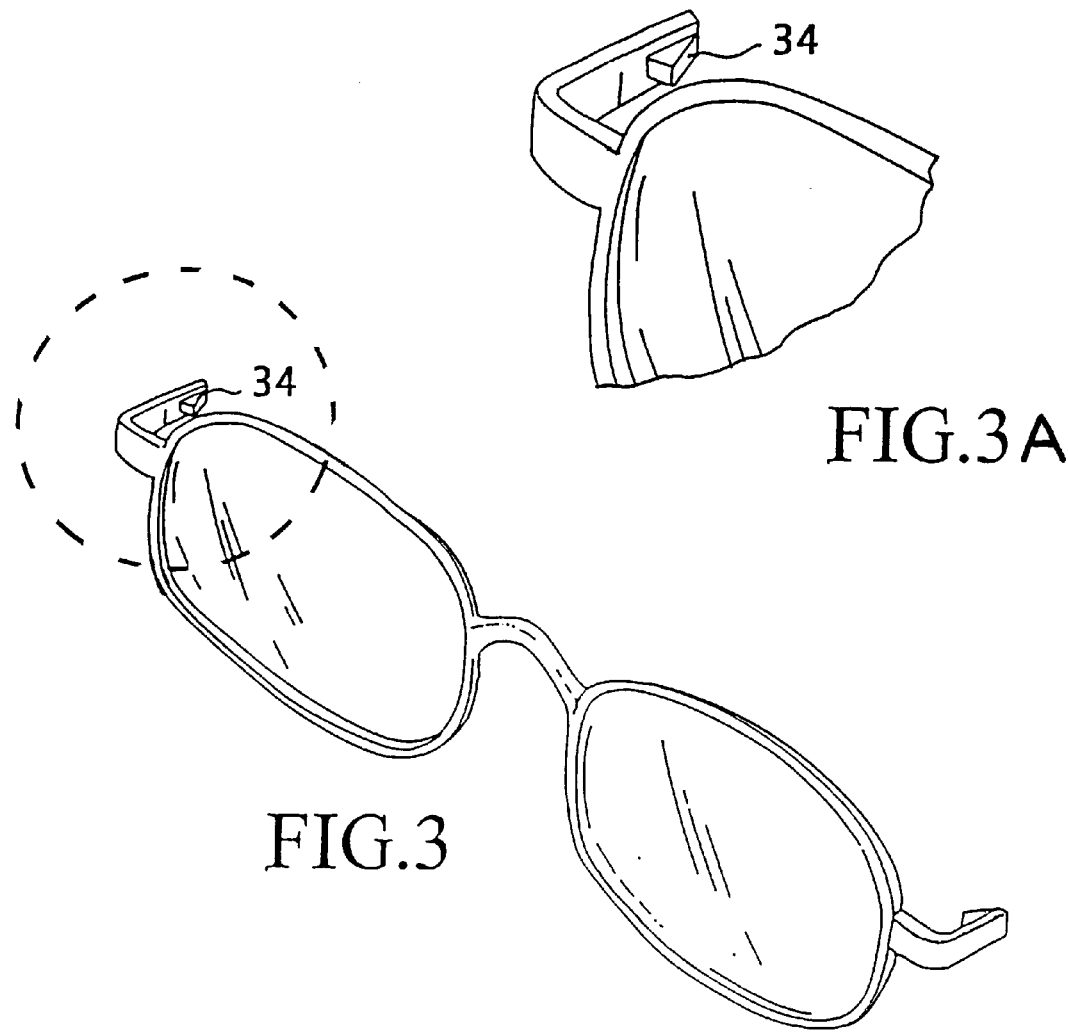
FIG. 3A
FIG. 3
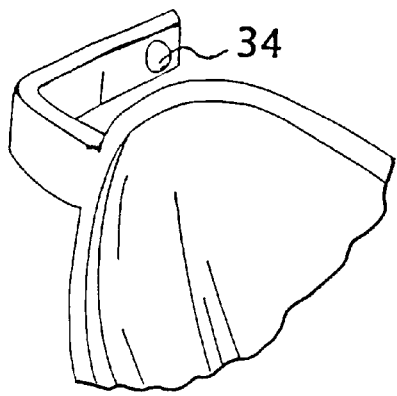
FIG. 4

EYEGLASS STRUCTURE

BACKGROUND OF THE INVENTION

(a) Field of the Invention

This invention relates to an eyeglass structure and in particular to a type of secondary lens structure. This frame is cast as a single piece and has no soldering joints. The hooks may be projecting beads or projecting clips, making replacement easy. This eyeglass device can be changed with different prescription lenses or sunglass lenses, all of the secondary lens structure. This is truly a revolutionary invention.

(b) Description of the Prior Art

Eyeglasses are the windows to the world. Once someone is near-sighted, eyeglasses act as the bridge to correct the vision. Since close distance usage (reading) or long distance usage all have varying lens prescriptions, it is quite common for near-sighted people to have a second pair of prescription glasses.

Furthermore, sunglasses can be used to filter out the strong light and protect the eyes. Bright sunlight on a hot summer day, on the beach, in the high mountains or on snowy surfaces, reflects the radiant and U.V. sunlight, stinging the eyes. In these types of surroundings, the eyes take in many times more than the normal amount of irritating bright light, which leads to discomfort. When this occurs, one must rely on sunglasses to block and filter out the bright light. And since sunglasses are practical, easy to carry along, and they come in an abundance of shapes and styles, they have become a necessary carry along item for most everyone.

Therefore, the number of glasses near-sighted people use may be three or four pairs (including sunglasses.) Yet this is nothing but a financial burden for people with economic limitations, like students.

Should a simple assembly be designed, whereby near-sighted lenses of varying prescriptions, or sunglass lenses could be used upon the same frame and furthermore are directed at changing different prescription lenses based upon the needed conditions, as well as offering a fast and easy way to change to and from sunglasses as the need occurs, thus alleviating the aforementioned problems, this assembly would have added practicality.

SUMMARY OF THE INVENTION

In order to attain this objective, this invention offers an improved type of eyeglass structure wherein a main frame and a secondary frame can be assembled and disassembled. The entire composition and structure are simple. The convenience of this invention is that its main frame can change with secondary lenses of varying prescriptions, with sunglasses or lenses of varying functions. It is truly a revolutionary eyeglass.

Furthermore, the purpose of this invention is to offer a type of eyeglass structure that is an assembly of a main frame and a secondary frame. This utilizes the relationship of the aligned recessed notches of the main frame and the hook sections of the secondary frame. This unit has a main frame and secondary frame, which has the function of assembling and disassembling. This same pair of glasses may have different prescription lenses, sunglass lenses or lenses with other functions.

BRIEF DESCRIPTION OF THE DRAWINGS

In order better understand the aforementioned invention, its other objectives, features and beneficial aspects, the following detailed description of the figures is provided below.

FIG. 3 is a perspective view of another embodiment secondary frame of the invention. FIG. 3A is an enlarged view of area A in FIG. 3.

FIG. 4 is a partial enlarged view of another embodiment of the secondary frame of the invention.

DESCRIPTION OF THE PREFERRED EMBODIMENT

Figure 1:
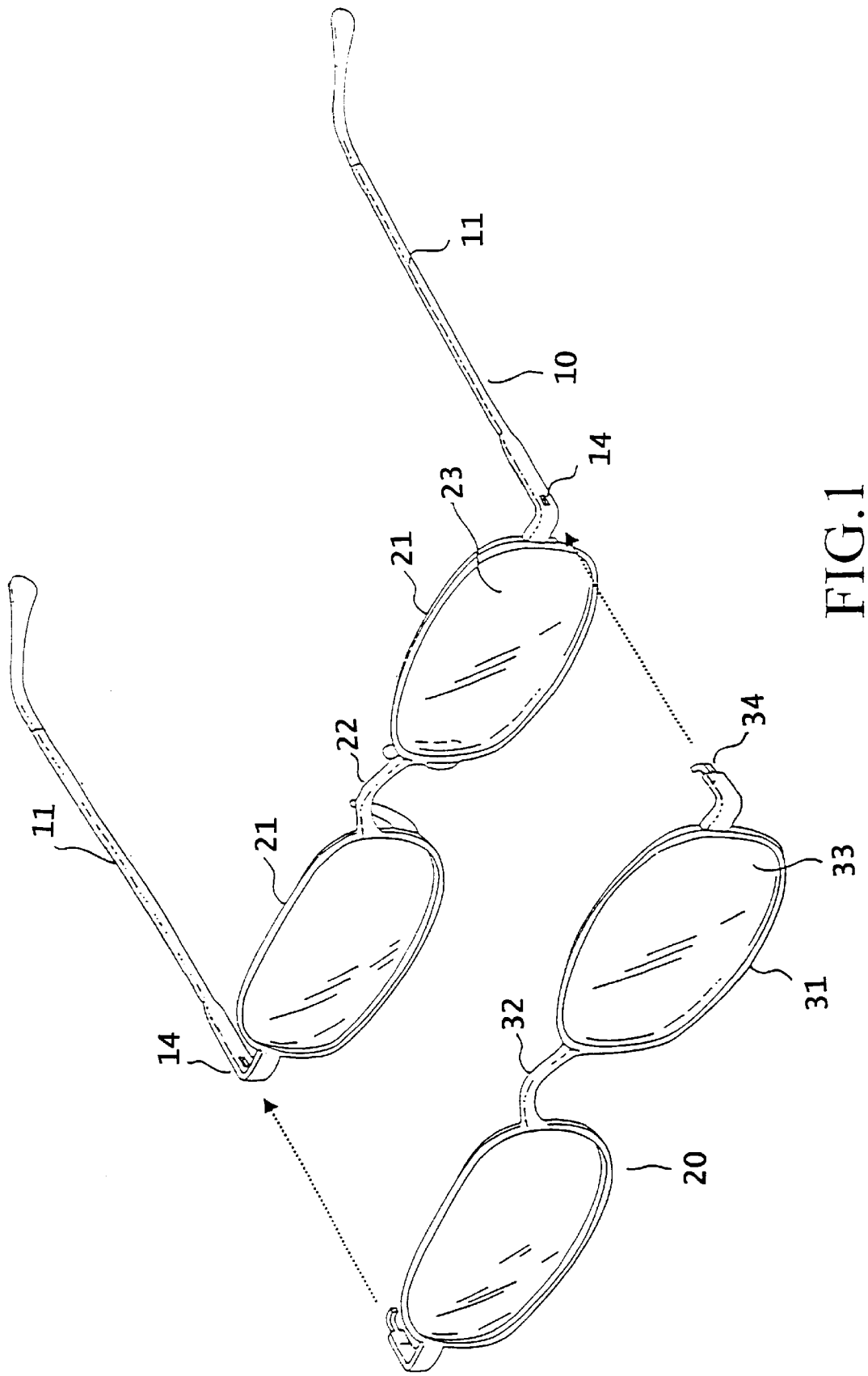
FIG. 1 is a perspective sectional drawing of the invention.
Figure 2:
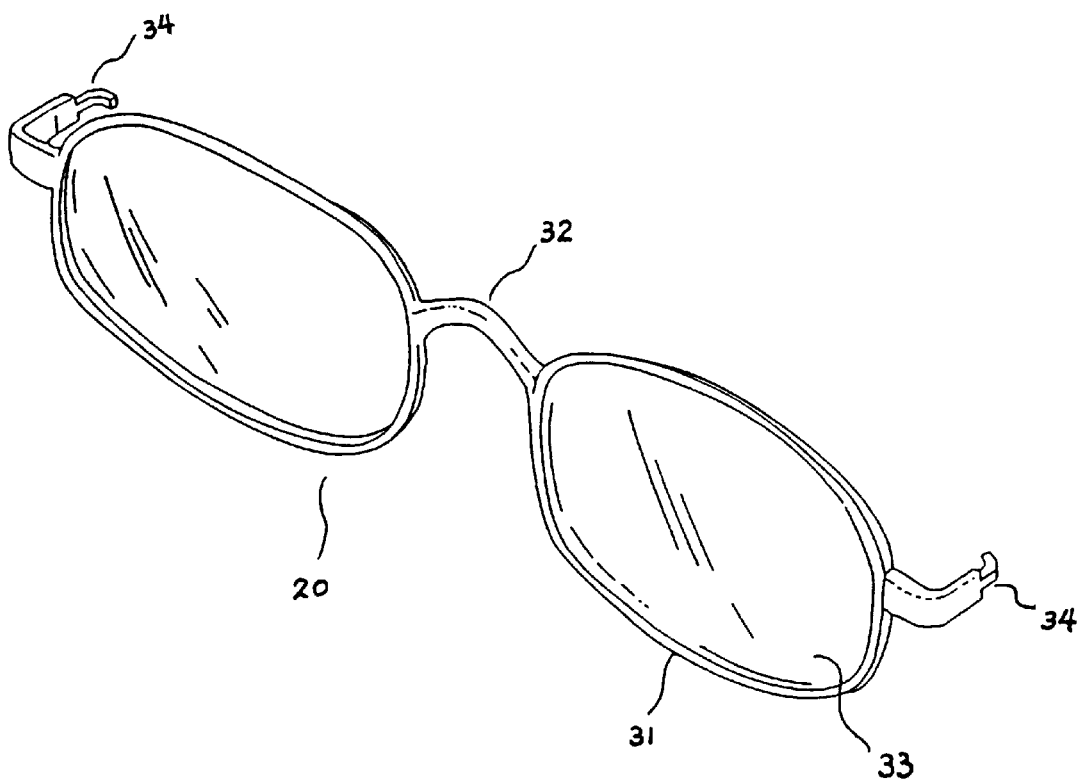
FIG. 2 is a perspective view of the secondary frame.

As shown in the drawings, the principal components of this invention are the attachable main frame 10 and the secondary frame 20.

As shown in FIG. 1, the main frame 10 is comprised of a bridge 22, rims 21 and ear stems 11. The two ear stems 11 are designed with recessed notches 14 upon the sides, whereby recessed notches 14's opening is positioned on the outer side of ear stem 11. The secondary frame is comprised of a single cast piece, therein being no coupling members on both rims 31, the bridge 32 and the two hook sections 34. In addition, this single piece includes the lenses 33. Both hook sections 34 are positioned on the outer sides of rims 31 and are both aligned to the recessed notches 14 on the main frame 10. Both rims 31 are positioned outside of lenses 33, and wrap around the outer edges of lenses 33.

In accordance with the aforementioned structure, the secondary frame 20's two hook sections 34 clip into the main frame 10's recessed notches 14 creating a firm clasp. In addition, both the main frame 10 and the secondary frame 20 hold fast and tight.

As FIGS. 1 to 4 show, the shapes and positioning of both the hook sections 34 and the recessed notches match and align, whereby hook sections 34's shape is that of a hook, projecting clip or projecting bead. For example, if hook sections 34's shapes are that of a projecting clip, then the recessed notches 14's shapes will accordingly be that of a recessed clip. If the hook sections 34's shapes are that of a projecting bead, then the recessed notches 14's shape will accordingly be that of a recessed bead. Accordingly, suitable shapes for this invention are not only limited to these, but include other suitable shapes used upon this invention.

The main frame 10 can hold two lenses 23 and both rims 21 are positioned outside of lenses 23, and wrap around the outer edges of lenses 23. The lenses 23 for the main frame 10 may be to correct near-sightedness or far-sightedness. At this time, secondary frame 20 may be sunglass lenses in which they may be used under normal conditions or in bright light situations. In addition, after the main frame 10 is attached with secondary frame 20, both pairs of the rims 21 and 31 can be stacked, so that the lenses 23 and the lenses 33 can also be stacked completely.

In another aspect of this invention, the main frame 10 of this invention can also hold more than one pair of lenses 23. This is perfect for different occasions. The secondary frame 20's lenses 33 can hold different types of prescription lenses, sunglass lenses or lenses with other functions. Additionally, the same pair of glasses can combine separate lenses for near-sightedness, far-sightedness or sunglass allowing the user to see far, near or in bright light conditions.

Therefore, as the aforementioned invention's eyeglasses can be easily changed for near-sightedness, far-sightedness or bright light conditions, its eyeglasses are of great convenience and add to its practical efficiency. In addition, since the body of this invention's frame is designed and manufactured from a single mold, it doesn't need any finishing nor do hooks or magnets need to be soldered on, making it an advanced system! While manufacturing the ear stem of the said main frame's recessed notches, it too is a single cast and does not need additional processing. This not only reduces costs but decreases the percentage of defects.

In particular, as the main frame's recessed notches are aligned with the secondary frame's hook sections, their coupling method prevents any detaching.

Although the invention is described in practical terms above, it is not intended to be limited to the recitation of the preferred embodiments. Staying within the spirit and boundaries of the invention as described herein, those with competent technical skills may make any type of alteration or modification. This invention's protective boundaries are the clearly defined in appended claims of this patent application.

What is claimed is:

1. An eyeglass structure, comprising a main frame and secondary frame wherein:

the main frame has two primary rims, a primary bridge and a pair of ear stems, the primary bridge coupling both the primary rims, and an external side of each of said ear stems has a recessed notch; and the secondary frame has two secondary rims, a secondary bridge and two hook sections, the secondary bridge coupling both the secondary rims, the shapes and positioning of the hook sections matching that of the two recessed notches, the two primary rims having lenses therein, whereby the secondary frame is removably attached to the main frame by engagement of the hook sections into the recessed notches.

2. The eyeglass structure of claim 1 further comprising second lenses mounted in the primary rims.

3. The eyeglass structure of claim 1 wherein each hook section comprises a projecting bead.

4. The eyeglass structure of claim 1 wherein each hook section comprises a projecting clip.

* * * * *